US011936736B2

(12) United States Patent
Lee

(10) Patent No.: US 11,936,736 B2
(45) Date of Patent: Mar. 19, 2024

(54) INTERWORKING METHOD BETWEEN DIFFERENT 5G MULTI-ACCESS EDGE COMPUTING (MEC) PLATFORMS USING COMMON APPLICATION PROGRAMING INTERFACE FRAMEWORK (CAPIF)

(71) Applicant: ELECTRONICS AND TELECOMMUNICATIONS RESEARCH INSTITUTE, Daejeon (KR)

(72) Inventor: Seung-Ik Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/984,326

(22) Filed: Nov. 10, 2022

(65) Prior Publication Data

US 2023/0145165 A1    May 11, 2023

(30) Foreign Application Priority Data

Nov. 10, 2021 (KR) .......................... 10-2021-0154023
Oct. 28, 2022 (KR) .......................... 10-2022-0141114

(51) Int. Cl.
*H04L 67/51* (2022.01)
*H04L 67/133* (2022.01)

(52) U.S. Cl.
CPC ............ *H04L 67/133* (2022.05); *H04L 67/51* (2022.05)

(58) Field of Classification Search
CPC ............................. H04L 67/133; H04L 67/51
See application file for complete search history.

(56) References Cited

U.S. PATENT DOCUMENTS

2017/0303259 A1   10/2017  Lee et al.
2019/0230556 A1    7/2019  Lee
2020/0389531 A1*  12/2020  Lee .......................... H04L 67/01
(Continued)

FOREIGN PATENT DOCUMENTS

WO   WO-2021194583 A1 *  9/2021  ............. H04L 67/16
WO   WO-2023081202 A1 *  5/2023

OTHER PUBLICATIONS

ETRI, "New solution for Enablement of Service APIs exposed by EAS", 3GPP TR 23.700-98, 3GPP TSG-SA WG6 Meeting #46-e meeting, Nov. 15-23, 2021, Online.
(Continued)

*Primary Examiner* — Aftab N. Khan
(74) *Attorney, Agent, or Firm* — LRK PATENT LAW FIRM

(57) ABSTRACT

An interworking method between 5G multi-access edge computing (MEC) platforms using a common application programming interface framework (CAPIF) is disclosed. The MEC platform interworking method includes requesting an European telecommunications standards institute (ETSI) MEC to discover a MEC service by an edge enabler server (EES), in response to a request of an edge application server (EAS), obtaining, by the EES, information of a matched MEC service in response to the request of the EAS from the ETSI MEC, and transmitting the information of the matched MEC service by the EES such that the EAS invokes a MEC service provided by the ETSI MEC.

11 Claims, 8 Drawing Sheets

(56) References Cited

U.S. PATENT DOCUMENTS

| | | | |
|---|---|---|---|
| 2021/0007166 A1* | 1/2021 | Liao | H04W 48/16 |
| 2021/0067605 A1* | 3/2021 | Roth | H04L 67/10 |
| 2021/0153019 A1* | 5/2021 | Bachmutsky | H04W 28/02 |
| 2021/0211914 A1* | 7/2021 | de la Oliva | H04W 24/10 |
| 2022/0086218 A1* | 3/2022 | Sabella | H04M 15/66 |
| 2022/0174585 A1* | 6/2022 | Ge | H04L 67/51 |
| 2022/0191776 A1* | 6/2022 | Kim | H04W 12/06 |

OTHER PUBLICATIONS

ETRI, Uangel, "New solution—Interworking with ETSI MEC using CAPIF for exposing/invoking APIs", 3GPP TR 23.700-98, 3GPP TSG-SA WG6 Meeting #46-e meeting, Nov. 15-23, 2021, Online.

* cited by examiner

INTERWORKING METHOD BETWEEN DIFFERENT 5G MULTI-ACCESS EDGE COMPUTING (MEC) PLATFORMS USING COMMON APPLICATION PROGRAMING INTERFACE FRAMEWORK (CAPIF)

CROSS-REFERENCE TO RELATED APPLICATIONS

This application claims the benefit of Korean Patent Application No. 10-2021-0154023 filed on Nov. 10, 2021 and Korean Patent Application No. 10-2022-0141114 filed on Oct. 28, 2022, in the Korean Intellectual Property Office, the entire disclosures of which are incorporated herein by reference for all purposes.

BACKGROUND

1. Field of the Invention

One or more example embodiments relate to an interworking method between a third generation partnership project (3GPP) EDGEAPP platform and an European telecommunications standards institute (ETSI) multi-access edge computing (MEC) platform using a common application programming interface framework (CAPIF).

2. Description of Related Art

An edge computing technique of transmitting data by using an edge server has been discussed. The edge computing technique may include multi-access edge computing (MEC) or fog computing (FOC). The edge computing technique may refer to a method of providing data to an electronic device through a separate server (e.g., an edge data network, a MEC server, or a mobile edge host) installed geographically close to the electronic device, for example, inside a base station or near the base station. For example, an application requiring low latency among applications installed in an electronic device may transmit/receive data through an edge server installed at a geographically close location without a server located in an external data network (DN) (e.g., the Internet).

A service (e.g., a MEC-based service or an edge computing service) using the edge computing technique has been discussed and research and development have been conducted for an electronic device to support the edge computing service. For example, an application of an electronic device may transmit/receive edge computing-based data on an application layer and an edge server (or an application of the edge server).

As research and development have progressed to support the edge computing service, a method of efficiently operating a MEC system resource has been discussed while satisfying a latency requirement of a service by an edge DN (e.g., a MEC server) that provides the edge computing service. For example, in a hierarchical edge DN, a method of redeploying an edge computing service to a terminal has been studied.

The above description is information the inventor(s) acquired during the course of conceiving the present disclosure, or already possessed at the time, and is not necessarily art publicly known before the present application was filed.

SUMMARY

According to exclusiveness of existing mobile communication networks, it is difficult to use network information and service of an external multi-access edge computing (MEC) application and interwork between systems. Thus, a 5G MEC technique is limited to network operator-led usage, and the expansion effect of the 5G+ integrated service industry may be limited. To expand the 5G+ integrated service industry, it may be required to share network resources and services in the 5G network and support a service application programming interface (API) to expose (or provide) in the 5G MEC platform by a third party service operator.

In an example embodiment, a common application programming interface framework (CAPIF) technique for interworking between a 3GPP EDGEAPP platform and an ETSI MEC platform may be adopted and based on this, an interface may be newly defined and cross invoking of each service API may be supported.

In an example embodiment, to provide a flexible 5G MEC service in platforms with different structures, it may be effective in aspects of expanding application of a MEC service, business expansion, flexible installation and configuration, and a MEC network resource usage efficiency by providing interworking between a 3GPP EDGEAPP platform and an ETSI MEC platform based on a CAPIF.

However, the technical aspects are not limited to the aforementioned aspects, and other technical aspects may be present.

According to an aspect, there is provided a multi-access edge computing (MEC) platform interworking method including requesting an European telecommunications standards institute (ETSI) MEC to discover a MEC service by an edge enabler server (EES), in response to a request of an edge application server (EAS), obtaining, by the EES, information of a matched MEC service in response to the request of the EAS from the ETSI MEC, and transmitting the information of the matched MEC service by the EES such that the EAS invokes a MEC service provided by the ETSI MEC.

The MEC platform interworking method further includes requesting the EAS to discover a MEC service required to execute the EES through a common application programming interface framework (CAPIF)-1 interface.

The requesting includes requesting the ETSI MEC to discover a MEC service by the EES through a CAPIF-6 interface.

The obtaining includes receiving the information of the matched MEC service by the EES through a CAPIF-6 interface.

The transmitting includes transmitting the information of the matched MEC service to the EAS by the EES through a CAPIF-1 interface.

The EAS invokes the matched MEC service through a CAPIF-2 interface.

According to an aspect, there is provided a MEC platform interworking method including receiving a request of an ETSI MEC by an EES, retrieving information of an EAS service API by the EES, in response to the request of the ETSI MEC, and transmitting, to the ETSI MEC, information of a matched EAS service API in response to the request of the ETSI MEC by the EES such that the ETSI MEC invokes a service API exposed by the EAS.

The MEC platform interworking method further includes publishing a service API exposed through a CAPIF-4 interface to the EES by the EAS.

The receiving includes receiving the request of the ETSI MEC through a CAPIF-6 interface by the EES.

The transmitting includes transmitting, to the ETSI MEC, information of the matched EAS service API through a CAPIF-6 interface by the EES.

The ETSI MEC invokes the matched EAS service API through a CAPIF-2 interface.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
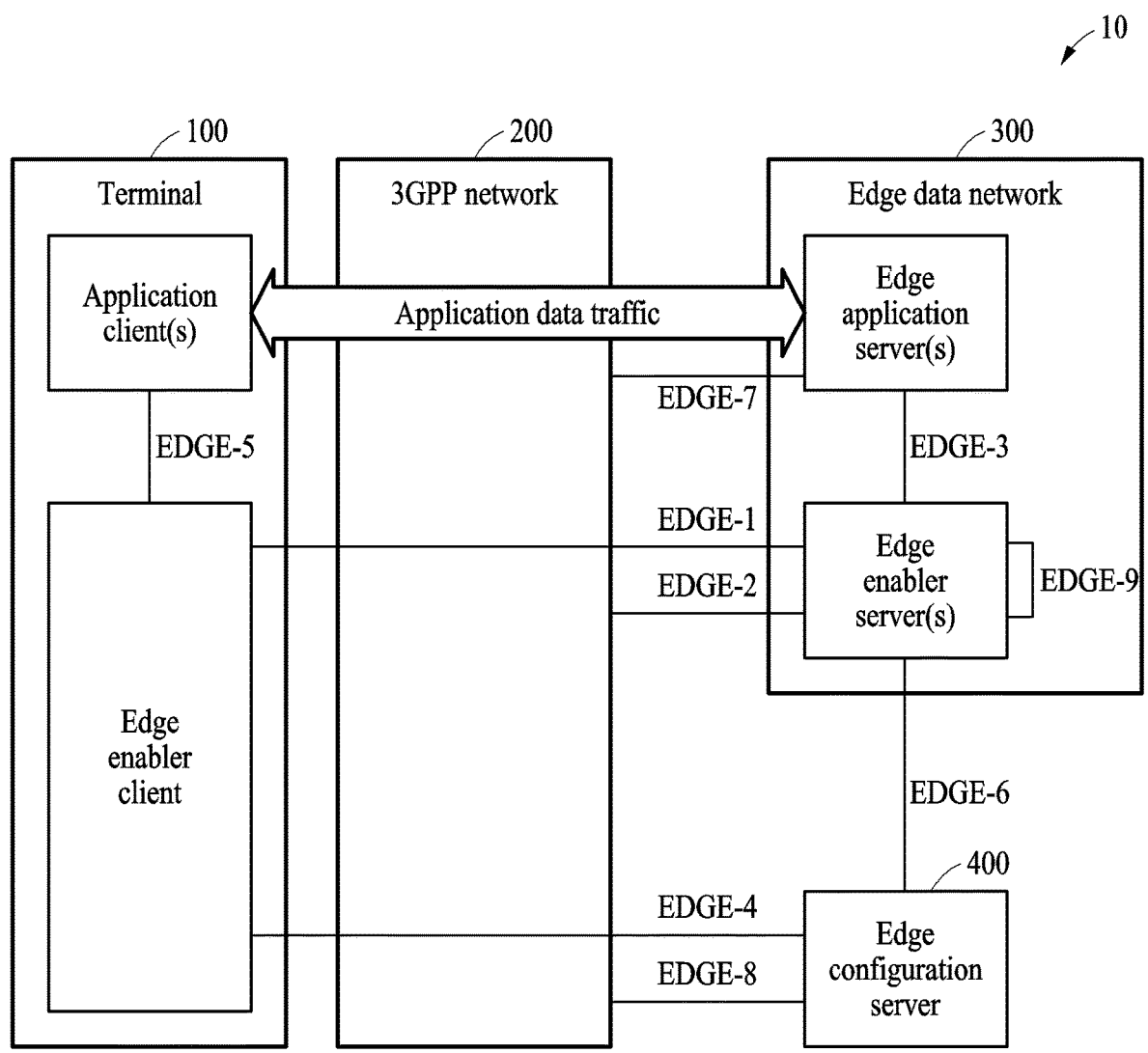
FIG. 1 is a diagram schematically illustrating a network environment for supporting an edge computing service, according to an example embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The term "unit" or the like used herein may refer to a software or hardware component, such as a field-programmable gate array (FPGA) or an application-specific integrated circuit (ASIC), and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units."Furthermore, the components and "units" may be implemented to operate on one or more central processing units (CPUs) within a device or a security multimedia card. In addition, "unit" may include one or more processors.

Hereinafter, the embodiments will be described in detail with reference to the accompanying drawings. When describing the examples with reference to the accompanying drawings, like reference numerals refer to like components and a repeated description related thereto will be omitted.

FIG. 1 is a diagram schematically illustrating a network environment for supporting an edge computing service, according to an example embodiment.

Referring to FIG. 1, a network environment 10 (e.g., a third generation partnership project (3GPP) 5G multi-access edge computing (MEC) platform (e.g., an EDGEAPP)) may include a terminal 100, a 3GPP network (e.g., a 3GPP core network) 200, an edge data network 300, and an edge configuration server (ECS) (e.g., an edge data network configuration server) 400. The network environment 10 may not be limited to the components 100 to 400 illustrated in FIG. 1.

Each component included in the network environment 10 may represent a physical entity unit or may represent software or a module performing individual functions. A component included in the network environment 10 may be referred to as an entity or a function.

The terminal 100 may be a device used by a user. For example, the terminal 100 may represent user equipment (UE), a remote terminal, a wireless terminal, or a user device. The terminal 100 may include all types of electronic devices.

The terminal 100 may include one or more application clients (AC) and edge enabler clients (EEC). An AC may be referred to as an UE application (UE app) or a client application.

The terminal 100 may execute (or run) one or more ACs. An AC may require different application services.

The AC may represent a default application pre-installed on the terminal 100 or an application provided by a third party. The AC may represent a client application program run on the terminal 100 for a predetermined application service. Various ACs may run on the terminal 100. At least one of ACs may be used for providing an edge computing service to the terminal 100 from the edge data network 300. The AC may exchange service data through interaction with an edge application server (EAS) as a client side of a MEC application. For example, the AC may be an application installed on the terminal 100 and executed and may provide a function to transmit/receive to or from data through the edge data network 300. The AC may represent application software (or a module) executed by the terminal 100 to use a function provided by one or more predetermined EASs (e.g., an edge application).

An EEC may represent a layer that performs an operation in the terminal 100 that enables the terminal 100 to use an edge computing service. The EEC may determine which AC (e.g., an UE app) may use an edge computing service and may connect a network interface to the edge data network 300 configured to provide the edge computing service to transmit data of the AC of the terminal 100. The EEC may search for and find an EAS.

The 3GPP communication layer may represent a layer configured to perform a modem operation to use a mobile communication system and may perform an operation of establishing wireless connection for data communication, registering the terminal 100 in the mobile communication system, establishing connection for data transmission to the mobile communication system, and transmitting/receiving data.

The 3GPP network 200 may be a wireless communication system compliant to a 3GPP standard and may provide a wireless communication service to the terminal 100 by connecting to the terminal 100. The 3GPP network 200 may include a third generation (3G) network, a long-term evolution (LTE) network, an LTE-A network, and a next generation network (5G or new radio (NR)). However, the example is not limited thereto, and the 3GPP network 200 may include a network configured by a different communication technique.

The 3GPP network 200 may include a radio access network (RAN) (not illustrated) and a core network (not illustrated). The RAN is a network directly connected to the terminal 100 and may be an infrastructure configured to provide wireless connection to the terminal 100. The RAN may include a plurality of base stations, and the plurality of base stations may communicate with each other through an interface. At least some interfaces between the plurality of base stations may be wired or wireless. A base station may be referred to as a gNode B, an eNode B, a Node B, a BS, a wireless connection unit, a base station controller, a node in a network, or other terms having an equivalent technical meaning. The core network may process a control signal and data on the terminal 100 transmitted/received through the RAN. The core network may perform various functions, such as controlling a user plane and a control plane, processing mobility, managing subscriber information, billing, interoperating with a different system (e.g., an LTE system). To perform the various functions described above, the core network may include a plurality of entities functionally separated and having different network functions (NFs). For example, the core network may include any one or any combination of a user plane function (UPF), an access and mobility management function (AMF), a session management function (SMF), a policy control function (PCF), a network exposure function (NEF), a user data management (UDM), a network data analysis function (NWDAF), and a gateway mobile location center (GMLC).

The UPF may provide a data path (or a data plane) between the terminal 100 and the edge data network 300. The UPF may function as a gateway configured to deliver data (or a data packet) transmitted or received by the terminal.

The terminal 100 and the edge data network 300 may transmit/receive to or from data (or a data packet) through the UPF. A data network (DN) may exist between the edge data network 300 and the UPF.

The UPF may be disposed near the edge data network 300 to support an edge computing service to the terminal 100 and may transmit a data packet of the terminal 100 to the edge data network 300 at low latency or may transmit a data packet of the edge data network 300 to the terminal 100 at low latency.

The UPF may provide a data path between the terminal 100 and the edge data network 300 by using a data network connected via the Internet. Among data packets transmitted by the terminal 100, a data packet that may need to be transmitted via the Internet may be routed to a data network between the service server 400 and the terminal 100.

The NEF may be an NF to expose a capability and a service of NFs of the 3GPP network 200 to the outside. The NEF may be connected to an external server (e.g., the edge data network 300) and may transmit information of an event occurring in an NF in the 3GPP network 200 to the external server or may transmit information of an event requested by the external server to an internal NF. For example, a function and a service that the NEF exposes to the outside may include event reporting related to a location of the terminal 100, event reporting related to a session of the terminal 100, and event reporting of mobility management of the terminal 100. The external server may subscribe a function and a service that the NEF exposes and may access the function and the service.

The edge data network 300 may refer to a server to which the terminal 100 is connected to use an edge computing service. The edge data network 300 may be deployed at a location geographically close to a base station or inside the base station of the 3GPP network 200 connected to the terminal 100. The edge data network 300 may be referred to as a MEC server, a MEC host, an edge computing server, a mobile edge host, and an edge computing platform.

The edge data network 300 may include one or more EASs and one or more edge enabler server (EESs)s.

The edge data network 300 may execute (or run) one or more EASs. An EAS may be referred to as an edge application, a MEC application, or a ME (or MEC) App. An EAS may be an application (or an application server) provided by a third party (e.g., a service provider) in the edge data network 300 that provides an edge computing service. The EAS may be used to form a data session with an AC to transmit/receive data related to the AC to/from the AC. The EAS may form a data session with the AC. The data session may be a communication path formed to transmit/receive data between the EAS and the AC of the terminal 100.

The edge data network 300 may provide a virtual resource to an edge application (e.g., an EAS). For example, the virtual resource may include at least one of a computing resource, a storage resource, and a network resource (e.g., a network bandwidth), which may be used by the EAS. The EAS may be executed (or run) as a virtual machine.

The EES may be referred to as a MEC platform, a mobile edge platform (MEP), and a platform.

The EES may provide a function required to execute the EAS. For example, the EES may provide a function or an environment such that the EAS may provide an edge computing service to the terminal 100 or the EAS may consume an edge computing service. In addition, the EES may perform traffic control.

The edge computing service may collectively refer to a required procedure to use an edge application (e.g., the EAS) and an information-related service. The edge computing service may be provided or consumed by the EES and/or the EAS. For example, the EAS may provide an edge computing service to the terminal 100 or may consume an edge computing service provided by the EES to provide an edge computing service to the terminal 100. In addition, the EES may provide an edge computing service that is consumable to provide an edge computing service to the terminal 100 by the EAS. That is, the edge computing service may refer to a service provided to the terminal 100 by the edge data network 300 or the EAS or a service that is provided by the EES and consumed by the EAS.

The EES may provide an edge computing services to the EAS. For example, depending on a provided edge computing service, the EES may provide various pieces of information (e.g., data, content, information of a location of a terminal, caching data, information of a subscribed service) to the EAS. The EAS may provide an edge computing service to the terminal 100 by using an edge computing service provided by the EES. For example, the EAS may provide the edge computing service to the terminal 100 based on information provided by the EES as the edge computing service. The edge computing service provided to the terminal 100 may be a required service for the terminal 100 to run an AC (e.g. provide required data to run an AC).

The EES may include a MEC service (not illustrated) and a service registry (not illustrated). The MEC service may provide an edge computing service to EASs included in the edge data network 300. The MEC service may be implemented as software or a module that may perform an individual function. The service registry may provide information for an edge computing service available in the edge data network 300.

When an instance of the EAS is instantiated, the EES may internally register the EAS. The EES may register the EAS and may store information related to the EAS. The EAS-related information stored by the EES may include information of an edge computing service that the EAS provides to the terminal 100, information on whether the edge computing service is a required service or an optional service to the EAS, and the like.

The EAS may register a new edge computing service in the EES, may update an already registered edge computing service, or may search for an edge computing service registered in the EES. While the EAS registers or updates the edge computing service in the EES, the EAS may provide, to the EES, information of the edge computing service to be registered or updated. The EES may register the edge computing service in the service registry.

The EES may transmit, to the EAS in the edge data network 300, information of edge computing services registered in the service registry. For example, the EES may transmit a list of edge computing services registered in the service registry to the EAS. In addition, the EES may transmit, to the EAS, information of availability of edge computing services, which are registered in the service registry or newly registered.

The EAS may subscribe an edge computing service registered in the service registry. The EAS may subscribe an edge computing service by transmitting subscription request information on the edge computing service to the EES. That the EAS subscribes the edge computing service may represent that EES continuously provides the edge computing service or information of the edge computing service.

The ECS 400 may provide support functions for the terminal 100 to connect to the EES. The ECS 400 may be referred to as an edge data network management server and a configuration server and may function as a mobile edge platform manager (MEPM) or a multi-access edge orchestrator (MEO). The ECS 400 may be a MEC management proxy (MMP) server or a domain name system (DNS) server.

The ECS 400 may be an initial connection server that may be provided with edge data network configuration information for the terminal 100 to use the edge computing service. The ECS 400 may recognize deployment of edge data networks, and the terminal 100 may be provided with configuration information required to use an edge computing service by connecting to the ECS 400, for example, information of the edge computing service to be connected at a predetermined location.

The ECS 400 may provide edge data network configuration information to the EEC of the terminal 100. For example, the edge data network configuration information may include information for the terminal 100 to connect to the edge data network 300 by using service area information (e.g., information of an edge data network that provides a service to a predetermined area) and information to establish connection with an EES 330 (e.g., information to identify the edge data network).

Figure 2:
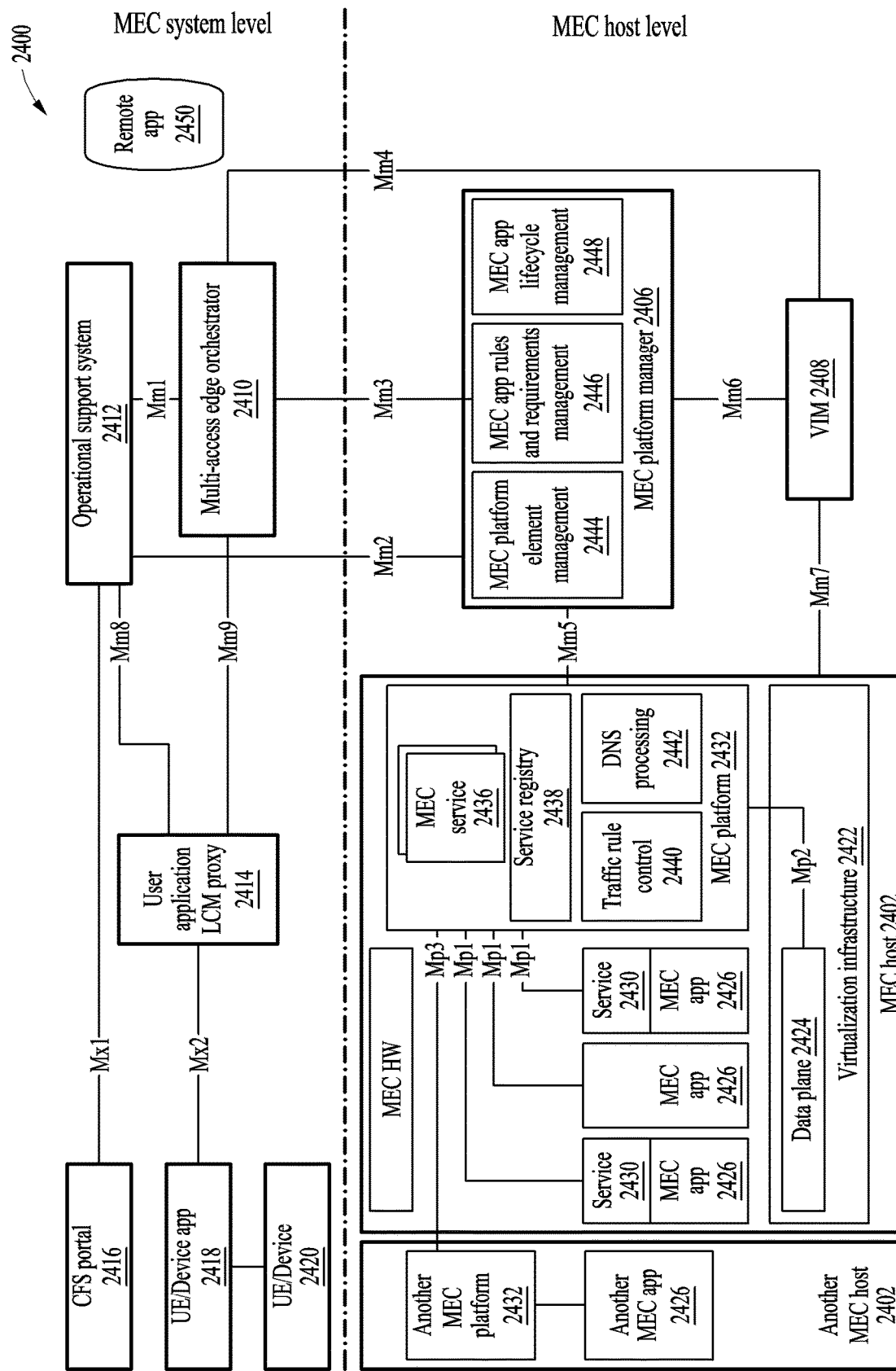
FIG. 2 is a diagram schematically illustrating a network environment for supporting an edge computing service, according to an example embodiment.

FIG. 2 is a diagram schematically illustrating a network environment for supporting an edge computing service, according to an example embodiment.

A network environment 2400 (e.g., European telecommunications standards institute for multi-access edge computing (ETSI-MEC)) may provide a cloud computing capability and an IT service environment to an application developer and a content provider in an edge of a network. This environment may be characterized by an ultra-low latency and high bandwidth as well as real-time access to wireless network information that may be used by an application. The MEC method may allow flexible and rapid distribution of a service and an innovative application to a mobile subscriber, a company, and a vertical field. Specifically, an application, such as a vehicle-to-everything (V2X) (e.g., an IEEE 802.11p-based protocol, such as DSRC/ITS-G5 or a 3GPP C-V2X-based protocol) may need exchange data, provide data to a collection point, and access data of a database that provides an overview of local conditions derived from multiple sensors (e.g., various vehicles, devices on a roadside, and the like).

A MEC architecture (e.g., the network environment 2400) may include a MEC host 2402, a virtualized infrastructure manager (VIM) 2408, a MEC platform manager 2406, a MEC orchestrator (MEC-O) 2410, an operational support system (OSS) 2412, a user application life cycle management proxy (UALCMP) 2414, a UE app 2418 executed in UE 2420, and a customer facing service (CFS) portal 2416.

The MEC host 2402 may include a MEC platform 2432 including a filtering rule control component 2440, a DNS processing component 2442, a service registry 2438, and a MEC service 2436. The MEC service 2436 may include at least one scheduler configured to select a resource to instantiate a MEC app 2426 (or a network functions virtualization (NFV)) in a virtualized infrastructure (VI) 2422. The MEC app 2426 may be configured to process different types of network communication traffic associated with at least one wireless connection (e.g., connection to one or more RANs or core network functions) and/or provide a service 2430 that may include any other services described herein. Another MEC host 2402 may have the same or similar configuration/implementation to the MEC host 2402 and another MEC app 2426 instantiated in the other MEC host 2402 may be similar to the MEC app 2426 instantiated in the MEC host 2402. The VI 2422 may include a data plane (DP) 2424 coupled to the MEC platform 2432 through an Mp2 interface. An additional interface among various network entities of the MEC architecture (e.g., the network environment 2400) is illustrated in FIG. 2.

The network environment 2400 (e.g., ETSI-MEC) may have a three reference point group including an "Mp" reference point on a MEC platform function, an "Mm" reference point, which is a management reference point, and an "Mx" reference point configured to connect a MEC entity to an external entity. The interface/reference point of the network environment 2400 may include IP-based connection and may be used to provide a representational state transfer (REST) or RESTful service. A message transmitted by using the reference point/interface may be in extensible markup language (XML), hypertext markup language (HTML), Javascript object notation (JSON), or any other desired format described herein. An appropriate authentication, authorization, and accounting (AAA) protocol, such as a radius or diameter protocol, may also be used for communication via the reference point/interface.

A logical connection among various entities of the network environment 2400 (e.g., ETSI-MEC) may be access-agnostic and may not depend on a specific distribution. The MEC may allow the MEC app 2426 to be implemented as a software-dedicated entity executed on the VI 2422 located inside or close to a network edge. The MEC app 2426 may be instantiated in the MEC host 2402 in the network environment 2400?MEC system 2400 and may be an application to potentially provide or consume the MEC service 2436.

The MEC entity illustrated in FIG. 2 may be grouped into a MEC system level entity, a MEC host level entity, and a network level entity (not illustrated). The network level (not illustrated) may include various external network level entities, such as a 3GPP network, a short-range communication network (e.g., a local area network (LAN), a wireless LAN (WLAN), a personal area network (PAN), a data network (DN), a local area DN (LADN), and the like), and an external network. The MEC system level may include a MEC system level management entity and the UE 2420, and a detail description thereof is provided below. The MEC host level may include one or more MEC hosts 2402 and 2404 and a MEC management entity, which may provide a function to execute the MEC app 2426 in an operator network or a subset of an operator network. The MEC management entity may include a specific MEC platform 2432, the MEC host 2402, and various components configured to process management of a specific MEC function of the MEC app 2426 to be executed.

The MEC platform manager 2406 may be a MEC management entity including the MEC platform element management component 2444, a MEC app rules and requirements management component 2446, and a MEC app lifecycle management component 2448. A remote app 2450 may be configured to communicate with the MEC host 2402 (e.g., the MEC app 2426) via the MEC-O 2410 and the MEC platform manager 2406.

The MEC host 2402 may be an entity configured to compute, store, and provide a network resource to execute the MEC app 2426 and may include the MEC platform 2432 and the VI 2422. The VI 2422 may include the DP 2424 that executes a traffic rule control 2440 received by the MEC platform 2432 and may route traffic among the MEC app 2426, the MEC service 2436, a DNS server/proxy (e.g., refer to passing through the DNS processing entity 2442), a 3GPP network, a local network, and an external network. The MEC DP 2424 may be connected to an (R)AN node and a 3GPP core network and/or may be connected to an access point through a wider network, such as the Internet and an enterprise network.

The MEC platform 2432 may itself provide multiple MEC services 2436 and may be a set of essential functions required to provide and consume the MEC service 2436 by executing the MEC app 2426 on a specific VI 2422. The MEC platform 2432 may also provide various services and/or functions, such as providing an environment in which the MEC app 2426 discovers, advertises, consumes, and provides the MEC service 2436, including an available MEC service 2436 through a different platform when the platform is supported. The MEC platform 2432 may allow the authorized MEC app 2426 to communicate with a third party server located in an external network. The MEC platform 2432 may receive a traffic rule from the MEC platform manager 2406, an application, or a service, and based on this, may instruct the DP (e.g., refer to the traffic rule control 2440). The MEC platform 2432 may send an instruction to the DP 2424 in the VI 2422 via an Mp2 reference point. The Mp2 reference point between the MEC platform 2432 and the DP 2424 of the VI 2422 may be used to instruct a DP 2434 on a method of routing traffic between applications, networks, services, and the like. The MEC platform 2432 may translate a token indicating the UE 2420, an UE app, an individual session, and/or an individual flow in a session in the traffic rule into a specific network address (e.g., an IP address). The MEC platform 2432 may also receive a DNS record from the MEC platform manager 2406 and based on this, may constitute a DNS proxy/server. The MEC platform 2432 may host the MEC service 2436 including a multi-access edge service and may provide access to visual information and a permanent storage. In addition, the MEC platform 2432 may communicate with another MEC platform 2432 of another MEC host 2402 via an Mp3 reference point. When an update, an activation, or a deactivation of a traffic rule is received from the MEC platform manager 2406, an app, or a service, the MEC platform 2432 may instruct the DP 2424 thereby. The MEC platform 2432 may also receive a DNS record from the MEC platform manager 2406 and by using this, may constitute the DNS proxy/server 2442. The traffic rule control 2440 may allow the MEC platform 2432 to perform traffic routing including traffic rule update, activation, and deactivation. In addition, the traffic rule control 2440 may allow the MEC platform 2432 to perform traffic steering by guiding a data packet through, for example, one or more access network connections in a multi-access environment including a multi-access network (each multi-access network may have a multi-access network connection and/or implement different access techniques).

The MEC platform 2432 may provide an environment in which the MEC app 2426 may discover, advertise, consume, and provide the MEC service 2436. When an update, an activation, or a deactivation of a traffic rule is received from the MEC platform manager 2406, the MEC app application 2426, or the service 2436, the MEC platform 2432 may instruct the DP 2424 thereby. The MEC platform 2432 may also receive a DNS record from the MEC platform manager 2406 and by using this, may constitute the DNS proxy/server (e.g., the DNS processing entity 2442).

The MEC platform 2432 may involve an API gateway function that supports reception of a service API request from the MEC app 2426 through a stable service connection endpoint. Changing a network address (e.g., an IP address) of a MEC service instance may not result in an update of service connection endpoint information. The API gateway function may also support API request throttling and API request monitoring for better processing, based on load balancing and configuration on multiple backend MEC service instances. The API gateway function may be used for statistics and billing.

The VI 2422 may represent all hardware and software components establishing an environment in which the MEC app 2426 and/or the MEC platform 2432 is distributed, managed, and executed. The VI 2422 may span multiple locations, and a network configured to provide connection among the locations may be considered as a part of the VI 2422. A physical hardware resource of the VI 2422 may include a computing resource, a storage resource, and a network resource, to provide processing, storing, and connection to the MEC app 2426 and/or the MEC platform 2432 through a virtualization layer (e.g., a hypervisor, a VM monitor (VMM), and the like). The virtualization layer may be a hardware abstraction layer and may abstract and/or logically partition a physical hardware resource of the MEC host 2402. The virtualization layer may allow software that implements the MEC app 2426 and/or the MEC platform 2432 to use a basic VI 2422 and may provide a virtualized resource to the MEC app 2426 and/or the MEC platform 2432 to execute the MEC app 2426 and/or the MEC platform 2432.

The MEC app 2426 may be instantiated in the MEC host/server 2402 in the MEC system 2400 and may be an application that may potentially provide or consume the MEC service 2436. The term "MEC service" may refer to a service provided through the MEC platform 2432 by the MEC platform 2432 itself or the MEC app 2426. The MEC app 2426 may be executed as a virtual machine (VM) on the VI 2422 provided by the MEC server 2402 and may consume and provide the MEC service 2436 by interacting with the MEC platform 2432. The Mp1 reference point between the MEC platform 2432 and the MEC app 2426 may be used to consume and provide a specific service function. The Mp1 reference point may provide service registration 2438, service discovery, and communication support on various services, such as the MEC service 2436 provided by the MEC host 2402. The Mp1 may also provide application availability, a support procedure for session state redeployment, activation of a traffic rule and a DNS rule, access to a permanent storage and visual information, and/or the like.

The MEC app 2426 may communicate with the MEC platform 2432 by using a MEC API disclosed in ETSI GS MEC 011 V2.1.1(2019-11).

The MEC app 2426 may be instantiated in the VI 2422 of the MEC server 2402, based on a verified configuration or a request by MEC management (e.g., the MEC platform manager 2406). The MEC app 2426 may interact with the MEC platform 2432 and may perform a specific support procedure associated with the lifecycle of the MEC app 2426, such as displaying availability and preparing for user state redeployment. The MEC app 2426 may have a predetermined number of rules and related requirements, such as a required resource, the maximum latency, and a required or useful service. A requirement may be confirmed by MEC management and if missing, a default value may be allocated to the requirement. The MEC service 2436 may be a service provided and/or consumed by the MEC platform 2432 and/or the MEC app 2426. A service consumer (e.g., the MEC app 2426 and/or the MEC platform 2432) may communicate with specific MEC services 2430 and 2436 via an individual API (e.g., various MEC APIs). When provided by an application, the MEC service 2436 may be registered in a service list of the service registry 2438 on the MEC platform 2432 through the Mp1 reference point. The MEC app 2426 may join one or more MEC services 2430 and 2436 approved through the Mp1 reference point. Examples of the MEC services 2430 and 2436 may include MEC application support, MEC service management, a radio network information service (RNIS), a location service, a UE identity service, a traffic management service (TMS) and BWMS, a device application interface, a WLAN access information (WAI) service, a fixed access information (FAI) service, a V2X information service (VIS), and/or other MEC services 2430 and 2436.

The MEC management may include MEC system level management and MEC host level management. The MEC management may include the MEC platform manager 2406 and the VIM 2408 and may process the MEC server 2402 and a MEC function of an application executed in the server. Some or all of the multi-access edge management components may be implemented by one or more servers located in one or more data centers and may use a virtualization infrastructure connected to an NFV infrastructure used to virtualize an NF or may use hardware that is the same as hardware in an NFV infrastructure.

The MEC platform manager 2406 may manage the lifecycle of an application including notifying an event associated with a relevant application to the MEC-O 2410. The MEC platform manager 2406 may provide the MEC platform element management component 2444 to the MEC platform 2432, manage the MEC app rules and requirements 2446 including a service approval, a traffic rule, a DNS configuration and troubleshooting, and may manage the MEC app lifecycle management 2448. The MEC platform manager 2406 may receive a virtualized resource, an error report, and performance measurement from the VIM 2408 for additional processing. An Mm5 reference point between the MEC platform manager 2406 and the MEC platform 2432 may be used to perform platform configuration, configuration of the MEC platform element management component 2444, the MEC app rules and requests 2446, the MEC app lifecycle management 2448, and management of application redeployment.

The VIM 2408 may be an entity to prepare the VI 2422 to allocate, manage, and release a virtualized (computing, storing, and networking) resource of the VI 2422 and execute a software image. To do so, the VIM 2408 may communicate with the VI 2422 through an Mm7 reference point between the VIM 2408 and the VI 2422. Preparing the VI 2422 may include configuring the VI 2422 and receiving/storing a software image. In addition, the VIM 2408 may collect and report performance and error information of a virtualized resource and if supported, may perform application redeployment. In case of application redeployment from or to an external cloud environment, the VIM 2408 may perform application redeployment by interacting with an external cloud manager. The VIM 2408 may communicate with the MEC platform manager 2406 through an Mm6 reference point, and this may be used to manage a virtualized resource to implement application lifecycle management. In addition, the VIM 2408 may communicate with the MEC-O 2410 and this may be used to manage a virtualized resource of the MEC server 2402 and an application image. Management of a virtualized resource may include tracking available resource capacity.

The MEC system level management may include the MEC-O 2410 with a complete overview of the MEC system 2400. The MEC-O 2410 may maintain an overall perspective of the MEC 2400, based on a distributed MEC host 2402, an available resource, n available MEC service 2436, and topology. The Mm3 reference point between the MEC-O 2410 and the MEC platform manager 2406 may be used to track an application lifecycle, manage application rules and requirements, and an available MEC service 2436. The MEC-O 2410 may communicate with the UALCMP 2414 via an Mm9 reference point to manage the MEC app 2426 requested by the UE app 2418.

The MEC-O 2410 may be responsible for onboarding of an application package including verifying the integrity and authenticity of the package, confirming application rules and requirements, controlling compliance with an operator policy if necessary, maintaining a record of an onboard package, and preparing VIM(s) 2408 to process an application. The MEC-O 2410 may select an appropriate MEC host(s) 2402 for application instantiation, based on a constraint, such as latency, an available resource, and an available service. The MEC-O 2410 may trigger application instantiation and termination and if necessary, may trigger application redeployment.

The OSS 2412 may be an OSS of an operator receiving a request for instantiation or termination of the MEC app 2426 from the UE app 2418 through the CFS portal 2416 and the Mx1 reference point. The OSS 2412 may determine approval of the request. The CFS portal 2416 (and an Mx1 interface) may be used by a third party to send a request to the MEC system 2400 to execute the UE app 2418 in the MEC system 2400. The approved request may be transmitted to the MEC-O 2410 for additional processing. If supported, the OSS 2412 may receive a request from the UE app 2418 to redeploy an application between an external cloud and the MEC system 2400. The Mm2 reference point between the OSS 2412 and the MEC platform manager 2406 may be used for configuration, defect and performance management of the MEC platform manager 2406. The Mm1 reference point between the MEC-O 2410 and the OSS 2412 may be used to trigger instantiation and termination of the MEC app 2426 in the MEC system 2400.

The UE app(s) 2418 may be one or more apps executed by the UE 2420 that may interact with the MEC system 2400 via the UALCMP 2414. The UE app(s) 2418 may be or may include or may interact with, in context of the MEC, one or more client applications, which are application software executed by a device using a function provided by one or more MEC apps 2426. The UALCMP 2414 may approve a request from the UE app 2418 of the UE 2420 and may interact with the OSS 2412 and the MEC-O 2410 to additionally process the request. In context of the MEC, the term "lifecycle management" may refer to a set of required functions to manage instantiation, maintenance, and termination of an instance of the MEC app 2426. The UALCMP 2414 may interact with the OSS 2412 via the Mm8 reference point and may be used to process the UE 2418 request to execute an application in the MEC system 2400. The user app may be the MEC app 2426 instantiated in the MEC system 2400 in response to a request of a user through an application (e.g., the UE app 2418) executed by the UE 2420. The UALCMP 2414 may allow the UE app 2418 to request onboarding, instantiation, and termination of the user application and if supported, may allow the UE app 2418 to request redeployment of the user application to the inside and outside of the MEC system 2400. In addition, the UALCMP 2414 may notify a state of the UE app to the user app. The UALCMP 2414 may be accessible only in a mobile network and may be used only when supported by the MEC system 2400. By using the Mx2 reference point between the UALCMP 2414 and the UE app 2418, the UE app 2418 may execute an application in the MEC system 2400 and may send a request to the MEC 2400 to move an application to the inside or outside of the MEC system 2400. The Mx2 reference point may be accessible only in a mobile network and may be used only when the MEC system 2400 supports.

To execute the MEC app 2426 in the MEC system 2400, the MEC-O 2410 may receive a request triggered by the OSS 2412, a third party, or the UE app 2418. In response to reception of the request, the MEC-O 2410 may select the MEC server/host 2402 to host the MEC app 2426 for calculation offloading. The request may include information of an application to execute and if possible, different information (e.g., a location where the application needs to be activated, rules and requirements of another application, and a location of an application image when the application is not onboarded in the MEC 2400).

The MEC-O 2410 may select one or more MEC host 2402 for a calculation-intensive task. The selected one or more MEC servers (e.g., XE136) 2402 may offload a calculation operation of the UE app 2418 based on various operational parameters, such as network capability and condition, calculation capability and condition, an application requirement, and/or other similar operational parameters.

The MEC-O 2410 may select one or more MEC servers 2402 to host the MEC app 2426 and/or offload calculation by considering information of a requirement and a currently available resource in the MEC system 2400. After the one or more MEC servers 2402(e.g., XE136) are selected, the MEC-O 2410 may send a request to the selected MEC host(s) 2402 to instantiate an application or an application task. An actual algorithm that is used to select the MEC server 2402 may depend on implementation, configuration, and/or operator distribution. A selection algorithm may, for example, perform not only a network function, processing, and offloading coding/encoding but also perform an application task and consider a network to distinguish traffic between various RATs, calculation, and an energy consumption requirement, and thus, may be based on a task offloading reference/parameter. Under a specific situation (e.g., a UE mobility event resulting in an increase in latency, load balancing determination, and the like) and if supported, the MEC-O 2410 may determine to select one or more new MEC hosts 2402, which may function as main/source nodes, and may begin transmission of an application instance or an application-related state information from one or more source MEC hosts 2402 to one or more target MEC hosts 2402.

Figure 3:
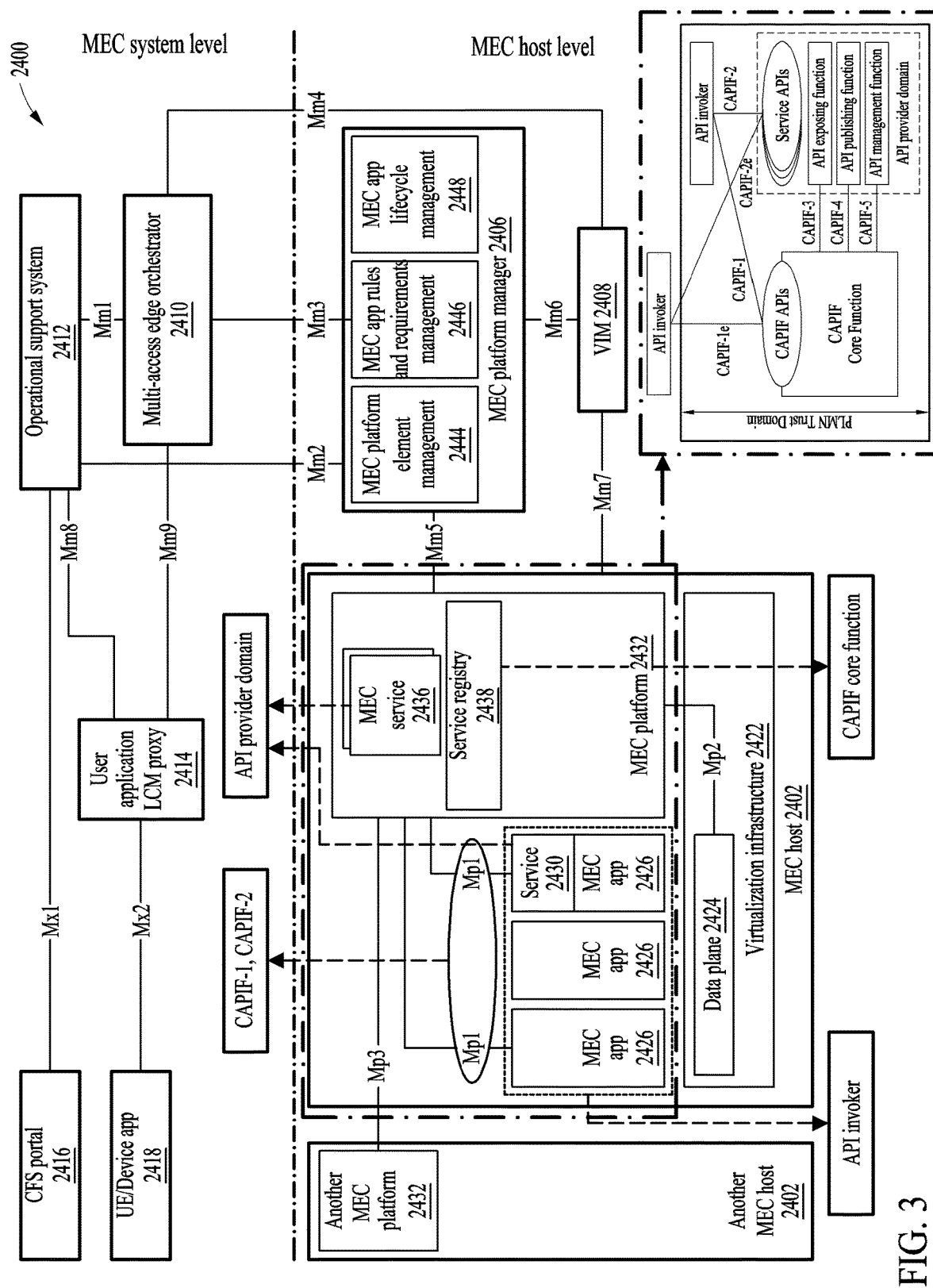
FIG. 3 is a diagram illustrating a relationship between multi-access edge computing (MEC) and a third generation partnership project (3GPP) common application programming interface framework (CAPIF), according to an example embodiment.
Figure 4:
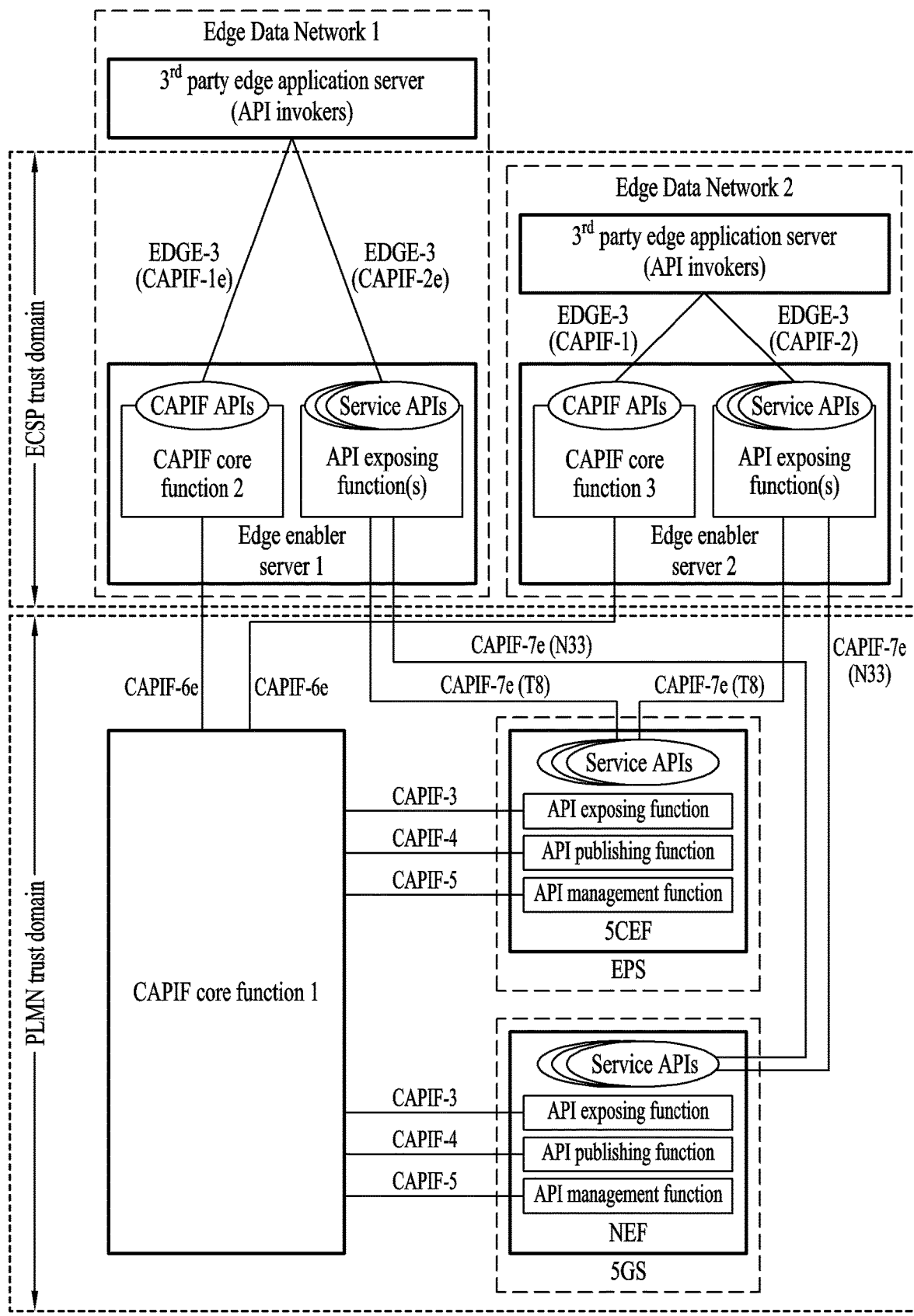
FIG. 4 is a diagram illustrating an edge enabler server (EES) that supports a distribution CAPIF function in an EDGEAPP, according to an example embodiment.

FIG. 3 is a diagram illustrating a relationship between MEC and a 3GPP common application programming interface framework (CAPIF), according to an example embodiment, and FIG. 4 is a diagram illustrating an EES that supports a distribution CAPIF function in an EDGEAPP, according to an example embodiment.

As described with reference to FIGS. 1 and 2, an EDGEAPP (e.g., the network environment 10 of FIG. 1) and an ETSI MEC (e.g., the network environment 2400 of FIG. 2) may support a function to expose a service API to an edge application. For example, the ETSI MEC may support exposing a MEC service provided by a MEC application and a MEC platform to a MEC application. The EDGEAPP may support exposing a service API provided by an EES (e.g., an EES service API) and 5GC to an EAS. The EDGEAPP may expose a service API (e.g., an EAS service API) provided by an EAS to another EAS.

An effort for alignment between the EDGEAPP and the ETSI MEC may be required. Referring to FIG. 3, in an ETSI MEC, some efforts may be made using "mapping MEC service management API to 3GPP CAPIF APIs" (e.g., refer to ETSI MEC GS MEC 011 v3.0.2(2021-11)). Referring to FIG. 4, the EDGEAPP may provide some deployment options using CAPIF with "Deployments in relation with CAPIF" (e.g., refer to TS 23.558 v17.1.0). However, the deployment option may not cover interworking with the ETSI MEC.

Alignment between the EDGEAPP and the ETSI MEC may be required and exposing and invoking a service API between the EDGEAPP and the ETSI MEC may need to be supported. Hereinafter, an example embodiment that enables interworking between the ETSI MEC and the EDGEAPP by using CAPIF for API exposing/invoking and alignment of the ETSI MEC and the EDGEAPP may be described. An example embodiment may include a CAPIF deployment option 1) to allow an EAS to invoke a MEC service and 2) to expose a service API provided by an EES to a MEC application.

Figure 5:
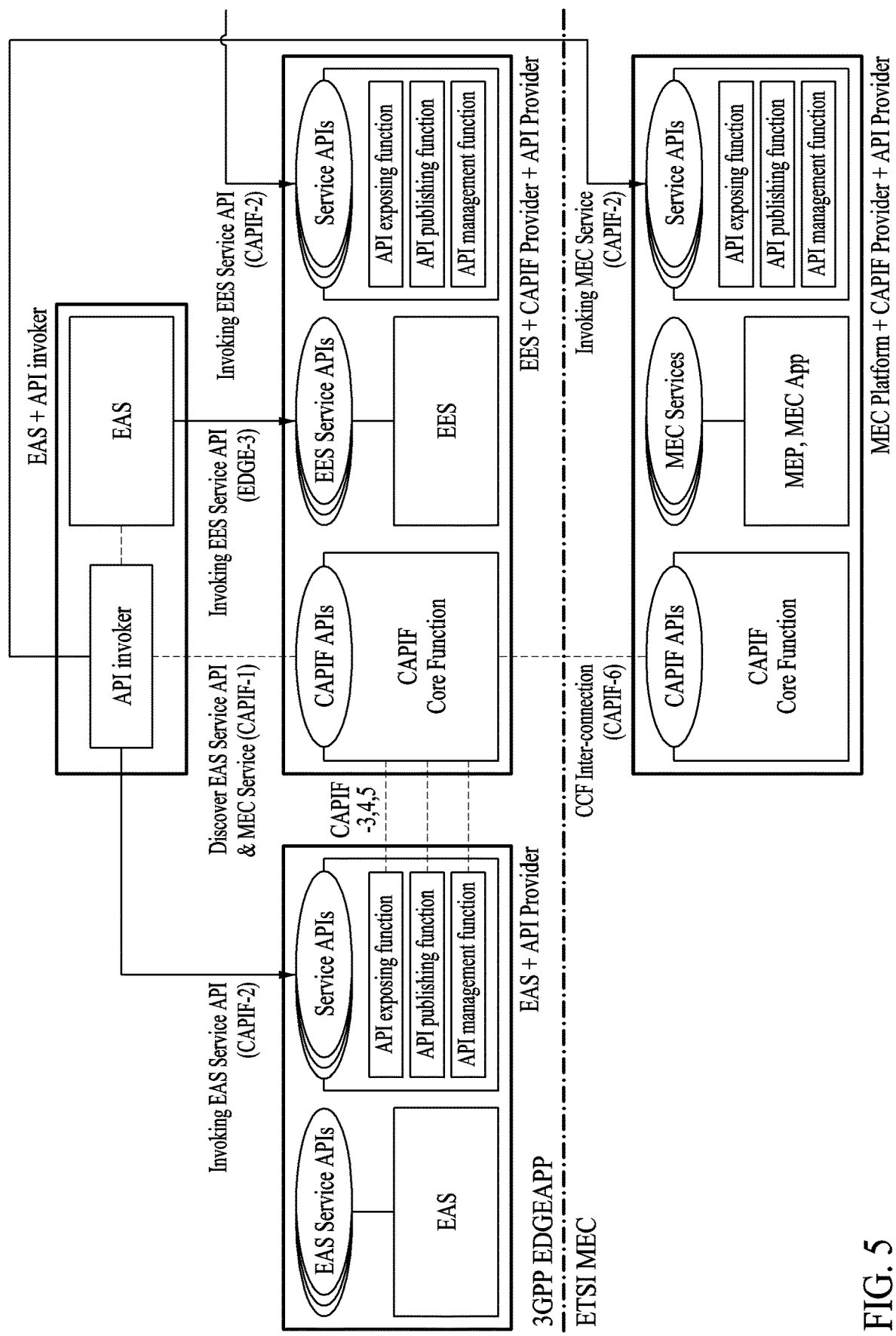
FIG. 5 is a diagram illustrating an interworking method between different 5G MEC platforms, according to an example embodiment.

FIG. 5 is a diagram illustrating an interworking method between different 5G MEC platforms, according to an example embodiment.

An example embodiment may include a deployment option of the EDGEAPP using a CAPIF interface to support exposing/invoking an API in the overall EDGEAPP and ETSI MEC architectures.

An example embodiment may interwork the ETSI MEC and the EDGEAPP by using a CAPIF interface for API exposing/invoking and may align the ETSI MEC and the EDGEAPP. An example embodiment may include a CAPIF deployment option 1) to allow an EAS to invoke a MEC service and 2) to expose a service API provided by an EES to a MEC application.

An example embodiment may solve alignment of the EDGEAPP and the ETSI MEC based on the ETSI MEC by using a CAPIF interface to expose and invoke a service API and may also solve "enablement of a service API exposed by an EAS" to expose an EAS service API to an ETSI MEC entity. An example embodiment may specify a CAPIF deployment option for the followings.

1. Allow an EAS to invoke a MEC service
2. Expose a service API provided by an EES or EAS to a MEC application An architecture in an example embodiment may expose an EAS|EES service API (e.g., an EAS service API or an EES service API) and may use a CAPIF to align with the ETSI MEC as a deployment option in an aspect of invoking a MEC service.

Based on the proposed deployment option, alignment of the EDGEAPP and the ETSI MEC may be performed by mapping or supplementing a own API to a CAPIF API to expose/invoke a service API and a MEC service.

Hereinafter, a detailed description of a deployment option according to an example embodiment is provided.

3GPP EDGEAPP

According to an example embodiment, an EES may include a CAPIF core function (CCF). The CCF may be co-located in the EES and may be implemented by the EES. The EES may manage a service API exposed by an EAS and/or an EES through the CCF. The CCF may manage a locally distributed API and API provider information. The EES may search for an EAS service API and/or a MEC service through CAPIF-1.

According to an example embodiment, the EES may interconnect to a CCF of the ETSI MEC through a CAPIF-6 interface of the CCF. The CCF of the EES may exchange information (e.g., a locally distributed API and API provider information) and interwork with the CCF of the ETSI MEC by performing a CCF interconnection operation.

According to an example embodiment, the EAS may include a CAPIF API provider function. The CAPIF API provider function may be co-located in the EAS and may be implemented by the EAS. The EAS may expose the EAS service API to the EDGEAPP EAS and/or the ETSI MEC application through the CAPIF API provider function.

According to an example embodiment, the EAS may include a CAPIF API invoker function. The CAPIF API invoker function may be co-located in the EAS and may be implemented by the EAS. The EAS may invoke the EAS service API and/or the ETSI MEC service through the CAPIF API invoker function (e.g., CAPIF-2).

According to an example embodiment, the EAS may invoke the EES service API through EDGE-3.

According to an example embodiment, the EES may include the CAPIF API provider function to expose the EES service API (e.g., a UE location API, an AC information exposing API, and the like) to an API invoker (e.g., an EAS, an ETSI MEC application, and the like). The EES may expose the EES service API (e.g., a UE location API, the AC information exposing API, and the like) to the API invoker (e.g., an EAS, an ETSI MEC application, and the like) through the CAPIF API provider function.

That is, not only the EAS service API but also the EES service API may be published in the CCF.

ETSI MEC

According to an example embodiment, an ETSI MEC (e.g., a MEP) may include a CCF. The CCF may be co-located in the ETSI MEC (e.g., a MEP) and may be implemented by the ETSI MEC (e.g., a MEP). The ETSI MEC (e.g., a MEP) may manage a MEC service exposed by a MEP and a MEC app through the CCF.

According to an example embodiment, the ETSI MEC (e.g., a MEP) may interconnect to a CCF of an EDGEAPP EES through a CAPIF-6 interface.

According to an example embodiment, the ETSI MEC (e.g., a MEP, a MEC app) may include a CAPIF API provider function. The CAPIF API provider functions may be co-located in the ETSI MEC (e.g., a MEP, a MEC app) and may be implemented in the ETSI MEC (e.g., a MEP, a MEC app). Accordingly, the EDGEAPP EAS may invoke a MEC service through a CAPIF-2 interface.

According to an example embodiment, the ETSI MEC (e.g., a MEC app) may include a CAPIF API invoker function. The CAPIF API invoker function may be co-located in the ETSI MEC (e.g., a MEC app) and may be implemented in the ETSI MEC (e.g., a MEC app). The ETSI MEC (e.g., a MEC app) may invoke an EDGEAPP EAS-|FES service API through a CAPIF API invoker function.

Figure 6:
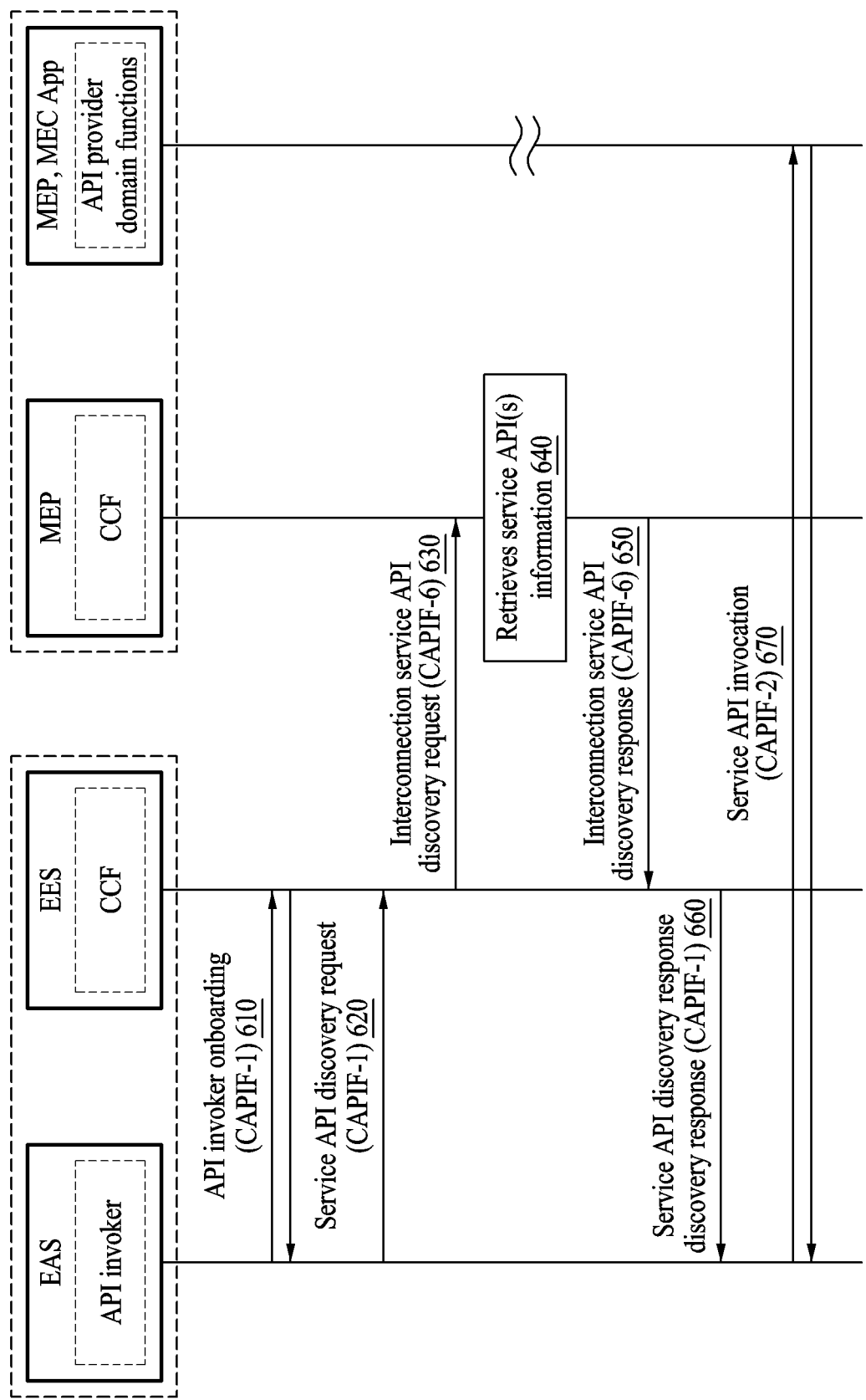
FIG. 6 is a diagram illustrating an operation of calling a MEC service provided by a mobile edge platform (MEP) or a MEC app using a CAPIF, according to an example embodiment.

FIG. 6 is a diagram illustrating an operation of calling a MEC service provided by a MEP or a MEC app using a CAPIF, according to an example embodiment. FIG. 6 may be an example that an EAS (e.g., an API invoker) invokes a MEC service (e.g., a service API) provided by a MEP or a MEC app (e.g., an API provider) using a CAPIF interface.

It is assumed with respect to FIG. 6 that the EAS completed EAS registration in the EES, an API provider function (e.g., an API provider domain function) of a MEP-|MEC app is registered in a CCF of a MEP through a CAPIF-5 interface, and a service API (e.g., a MEC service) of MEP|MEC app is published to the CCF of the MEP through a CAPIF-4 interface.

In operation 610, an EAS (e.g., an API invoker) may perform an onboarding process with an EES (e.g., a CCF) through a CAPIF-1 interface.

In operation 620, the EAS (e.g., an API invoker) may request, from an EES (e.g., a CCF), to discover a MEC service (e.g., a service API) required to execute through a CAPIF-1 interface.

In operation 630, the EES (e.g., a CCF) may request to discover a MEC service (e.g., a service API) in a MEP (e.g., a CCF) through a CAPIF-6 interface.

In operation 640, the MEP (e.g., a CCF) may retrieve MEC service (e.g., a service API) information from published information.

In operation 650, the MEP (e.g., a CCF) may respond to MEC service (e.g., a service API) information matched through the CAPIF-6 interface.

In operation 660, the EES (e.g., a CCF) may additionally respond to MEC service (e.g., a service API) information matched through the CAPIF-1 interface.

In operation 670, the EAS (e.g., an API invoker) may invoke a MEC service (e.g., a service API) provided by a MEP|MEC app through a CAPIF-2 interface.

Figure 7:
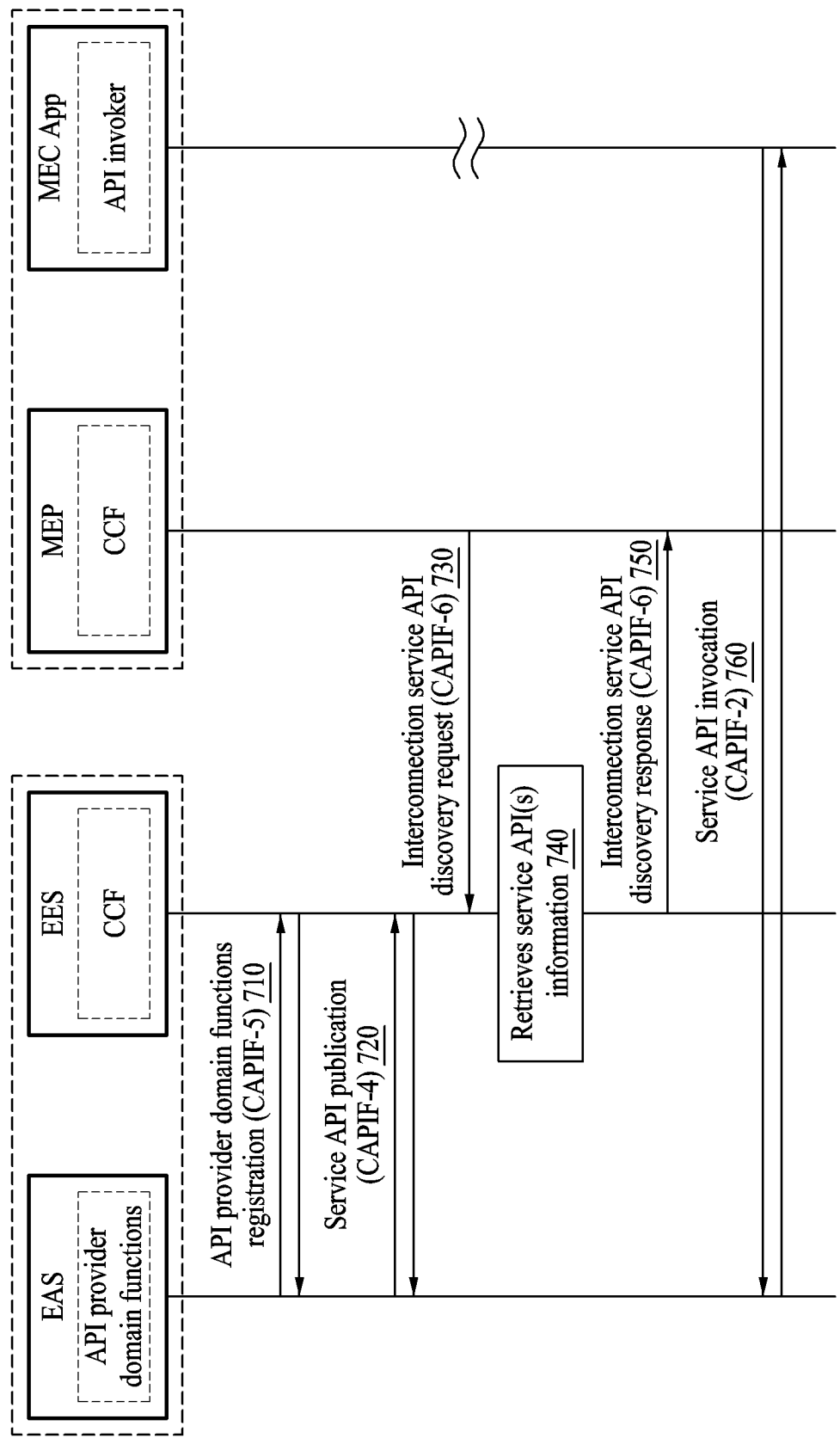
FIG. 7 is a diagram illustrating an operation of calling an edge application server (EAS) service application programming interface (API) provided by an EAS using a CAPIF, according to an example embodiment.

FIG. 7 is a diagram illustrating an operation of calling an edge application server (EAS) service application programming interface (API) provided by an EAS using a CAPIF, according to an example embodiment. FIG. 7 may be an example that a MEC application (e.g., an API invoker) invokes an EAS service API provided by an EAS (e.g., an API provider) by using a CAPIF interface.

It is assumed with respect to FIG. 7 that an EAS completed EAS registration in an EES, a MEC app completed API invoker onboarding to a MEP through a CAPIF-1 interface, a MEC app may request a MEP to discover a service API through the CAPIF-1 interface, and the MEC app may obtain service API information requested by the MEP through the CAPIF-1 interface.

In operation 710, an EAS (e.g., an AMF) may register an API provider domain function in an EES (e.g., a CCF) through a CAPIF-5 interface.

In operation 720, the EAS (e.g., an API provider function (APF)) may publish a service API exposed through a CAPIF-4 interface to the EES (e.g., a CCF).

In operation 730, a MEP (e.g., a CCF) may request the EES (e.g., a CCF) to discover an EAS service API through a CAPIF-6 interface.

In operation 740, the EES (e.g., a CCF) may discover information of a published EAS service API.

In operation 750, the EES (e.g., a CCF) may respond to information of an EAS service API matched through the CAPIF-6 interface.

In operation 760, the MEC app (e.g., an API invoker) may invoke an EAS service API provided by the EAS (e.g., an API exposing function (AEF)) through a CAPIF-2 interface.

Figure 8:
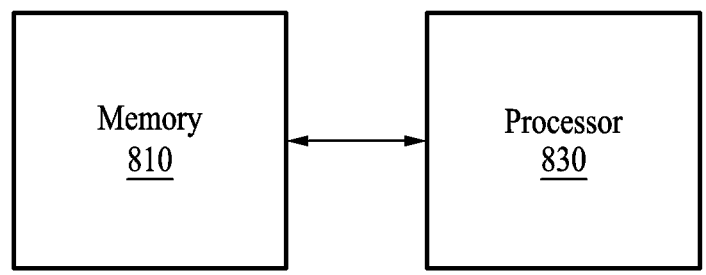
FIG. 8 is a schematic block diagram of a device according to an example embodiment.

FIG. 8 is a schematic block diagram of a device according to various embodiments.

Referring to FIG. 8, according to an example embodiment, a device 800 (e.g., a server device) may be substantially the same as the EAS, EES, and/or MEC described with reference to FIGS. 1 to 7. The device 800 may include a memory 810 and a processor 830.

The memory 810 may store instructions (e.g., a program) executable by the processor 830. For example, the instructions include instructions for performing the operation of the processor 830 and/or an operation of each component of the processor 830.

According to one embodiment, the memory 810 may be implemented as a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, and/or insulator resistance change memory.

The processor 830 may execute computer-readable code (e.g., software) stored in the memory 810 and instructions triggered by the processor 830. The processor 830 may be a hardware-implemented data processing device having a circuit that is physically structured to execute desired operations. The desired operations may include code or instructions included in a program. For example, the hardware-implemented data processing device may include a microprocessor, a CPU, a processor core, a multi-core processor, a multiprocessor, an ASIC, and an FPGA.

According to various example embodiments, operations performed by the processor 830 may be substantially the same as operations of the EAS, EES, and/or the MEC described with reference to FIGS. 1 to 7. Accordingly, a detailed description thereof is omitted.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A multi-access edge computing (MEC) platform interworking method comprising:
    requesting an European telecommunications standards institute (ETSI) MEC to discover a MEC service by an edge enabler server (EES), in response to a request of an edge application server (EAS);
    obtaining, by the EES, information of a matched MEC service in response to the request of the EAS from the ETSI MEC; and
    transmitting the information of the matched MEC service by the EES such that the EAS invokes a MEC service provided by the ETSI MEC.

2. The MEC platform interworking method of claim 1, further comprising:
    requesting the EAS to discover a MEC service required to execute the EES through a common application programming interface framework (CAPIF)-1 interface.

3. The MEC platform interworking method of claim 1, wherein the requesting comprises requesting the ETSI MEC to discover a MEC service by the EES through a common application programming interface framework (CAPIF)-6 interface.

4. The MEC platform interworking method of claim 1, wherein the obtaining comprises receiving the information of the matched MEC service by the EES through a common application programming interface framework (CAPIF)-6 interface.

5. The MEC platform interworking method of claim 1, wherein the transmitting comprises transmitting the information of the matched MEC service to the EAS by the EES through a common application programming interface framework (CAPIF)-1 interface.

6. The MEC platform interworking method of claim 1, wherein the EAS invokes the matched MEC service through a common application programming interface framework (CAPIF)-2 interface.

7. A multi-access edge computing (MEC) platform interworking method comprising:
    receiving a request of an European telecommunications standards institute (ETSI) MEC by an edge enabler server (EES);
    retrieving information of an edge application server (EAS) service application programming interface (API) by the EES, in response to the request of the ETSI MEC; and
    transmitting, to the ETSI MEC, information of a matched EAS service API in response to the request of the ETSI MEC by the EES such that the ETSI MEC invokes a service API exposed by the EAS.

8. The MEC platform interworking method of claim 7, further comprising:
    publishing a service API exposed through a common application programming interface framework (CAPIF)-4 interface to the EES by the EAS.

9. The MEC platform interworking method of claim 7, wherein the receiving comprises receiving the request of the ETSI MEC through a common application programming interface framework (CAPIF)-6 interface by the EES.

10. The MEC platform interworking method of claim 7, wherein the transmitting comprises transmitting, to the ETSI MEC, information of the matched EAS service API through a common application programming interface framework (CAPIF)-6 interface by the EES.

11. The MEC platform interworking method of claim 7, wherein the ETSI MEC invokes the matched EAS service API through a common application programming interface framework (CAPIF)-2 interface.

* * * * *